United States Patent
Takeuchi (10) Patent No.: US 11,101,486 B2
(45) Date of Patent: Aug. 24, 2021

(54) STACK CASE AND OUTER RESTRAINING MEMBER FOR FUEL CELL

(71) Applicant: TOYOTA JIDOSHA KABUSHIKI KAISHA, Toyota (JP)

(72) Inventor: Hiroaki Takeuchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 16/596,210

(22) Filed: Oct. 8, 2019

(65) Prior Publication Data
US 2020/0136166 A1  Apr. 30, 2020

(30) Foreign Application Priority Data

Oct. 31, 2018 (JP) .............................. JP2018-204970

(51) Int. Cl.
*H01M 8/241* (2016.01)
*H01M 8/2457* (2016.01)

(52) U.S. Cl.
CPC ......... *H01M 8/241* (2013.01); *H01M 8/2457* (2016.02)

(58) Field of Classification Search
None
See application file for complete search history.

(56) References Cited

U.S. PATENT DOCUMENTS

| 2006/0177722 | A1* | 8/2006 | Inagaki | H01M 8/249 |
| | | | | 429/434 |
| 2013/0089803 | A1* | 4/2013 | Nielsen | H01M 8/248 |
| | | | | 429/460 |
| 2015/0380762 | A1 | 12/2015 | Takeuchi et al. | |
| 2019/0198907 | A1* | 6/2019 | Uchiyama | H01M 8/247 |

FOREIGN PATENT DOCUMENTS

| JP | 2016-062713 | | 4/2016 |
| JP | 2017-174530 | | 9/2017 |
| JP | 2019-96509 | * | 6/2019 |
| WO | WO 2014/132562 | | 9/2014 |

* cited by examiner

*Primary Examiner* — Alix E Eggerding
(74) *Attorney, Agent, or Firm* — Finnegan, Henderson, Farabow, Garrett & Dunner, LLP

(57) ABSTRACT

A filling cover of which a surface facing a case insulator serving as a base member is in contact with a filling has at least side surface parts that cover side surfaces of the filling, and at least some of the side surface parts are not joined to the case insulator.

16 Claims, 9 Drawing Sheets

ATTACH FILLING AND COVER TO CASE INSULATOR

ATTACH CASE INSULATOR TO STACK CASE

INSERT FUEL CELL STACK (SINGLE-CELL STACK)
INTO STACK CASE WHILE COMPRESSING (SQUASHING) FILLING

STACK CASE AND OUTER RESTRAINING MEMBER FOR FUEL CELL

INCORPORATION BY REFERENCE

The disclosure of Japanese Patent Application No. 2018-204970 filed on Oct. 31, 2018 including the specification, drawings and abstract is incorporated herein by reference in its entirety.

BACKGROUND

1. Technical Field

The present disclosure relates to a stack case that houses a single-cell stack formed by a plurality of single fuel cells stacked together, and to an outer restraining member that restrains the single-cell stack from the outer side.

2. Description of Related Art

A fuel cell is composed of a fuel cell stack including a single-cell stack formed by a plurality of single fuel cells stacked together, and a stack case housing this fuel cell stack. To enhance the resistance of the fuel cell stack to vibration and impact and prevent displacement of the single fuel cells (cell displacement) in such a fuel cell, a technique of restraining the fuel cell stack on the stack case by interposing an interposition layer (hereinafter also referred to as a filling) made of an elastic material, such as silicon rubber or urethane rubber, between (the single-cell stack of) the fuel cell stack and the stack case has been proposed (e.g., see WO 2014/132562 and Japanese Unexamined Patent Application Publication No. 2017-174530 (JP 2017-174530 A)).

Aimed at securing insulation when restraining a fuel cell stack on a stack case through an interposition layer (filling), JP 2017-174530 A proposes a technique concerning the form of arrangement of the filling including an insulating layer (hereinafter also referred to as a case insulator). This insulating layer, disposed in a clearance between a stack outer wall surface of the fuel cell stack and a case inner wall surface of the stack case to provide insulation between the fuel cell stack and the stack case, has protruding portions that protrude from the case inner wall surface side toward the stack outer wall surface side, and the interposition layer is disposed inside each protruding portion between the insulating layer and the case inner wall surface of the stack case. The fuel cell stack is restrained on the stack case through the tops of the protruding portions of the insulating layer.

SUMMARY

The filling used for such a fuel cell can be disposed between the fuel cell stack and the stack case, for example, by a method in which the filling is installed after being squashed in advance outside the stack case (see also Japanese Unexamined Patent Application Publication No. 2016-062713 (JP 2016-062713 A)), or a method in which the filling is installed while being squashed by a member inside the stack case (an end plate of the fuel cell stack etc.).

Figure 6:
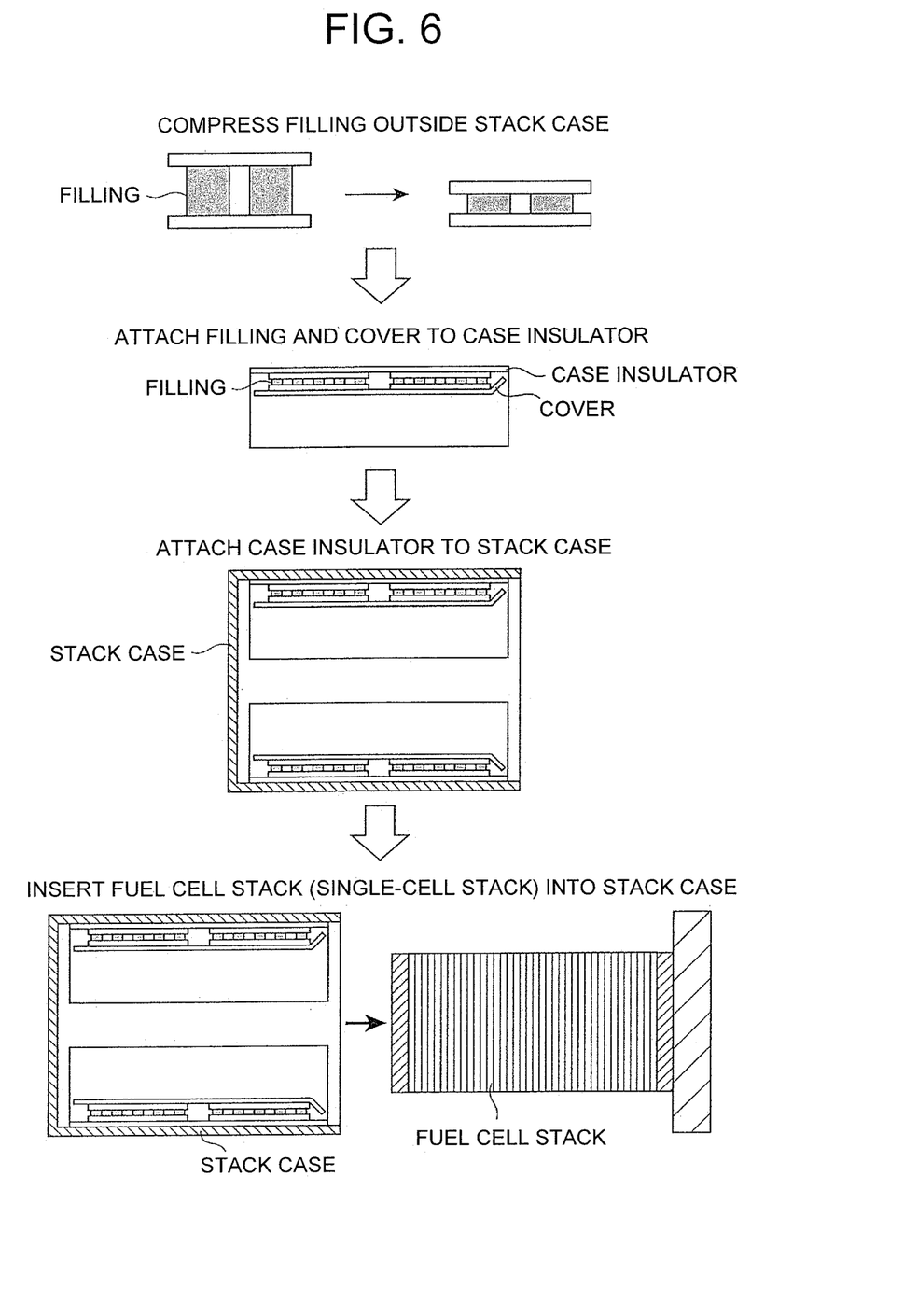
FIG. 6 is an illustration showing an example of fuel cell manufacturing processes including a method in which a filling is installed after being squashed in advance outside a stack case.

Specifically, as shown in FIG. 6, a filling having a thickness larger than the distance between a stack outer wall surface and a case inner wall surface is prepared, and this filling is compressed (squashed in advance) outside the stack case to a thickness smaller than the distance. Then, the compressed filling is attached to a case insulator and covered with a cover, and this case insulator is attached to the case inner wall surface (to the stack outer wall surface, in the technology described in JP 2016-062713 A). Before the filling expands to the thickness of the distance, the fuel cell stack is inserted into the stack case.

Figure 7:
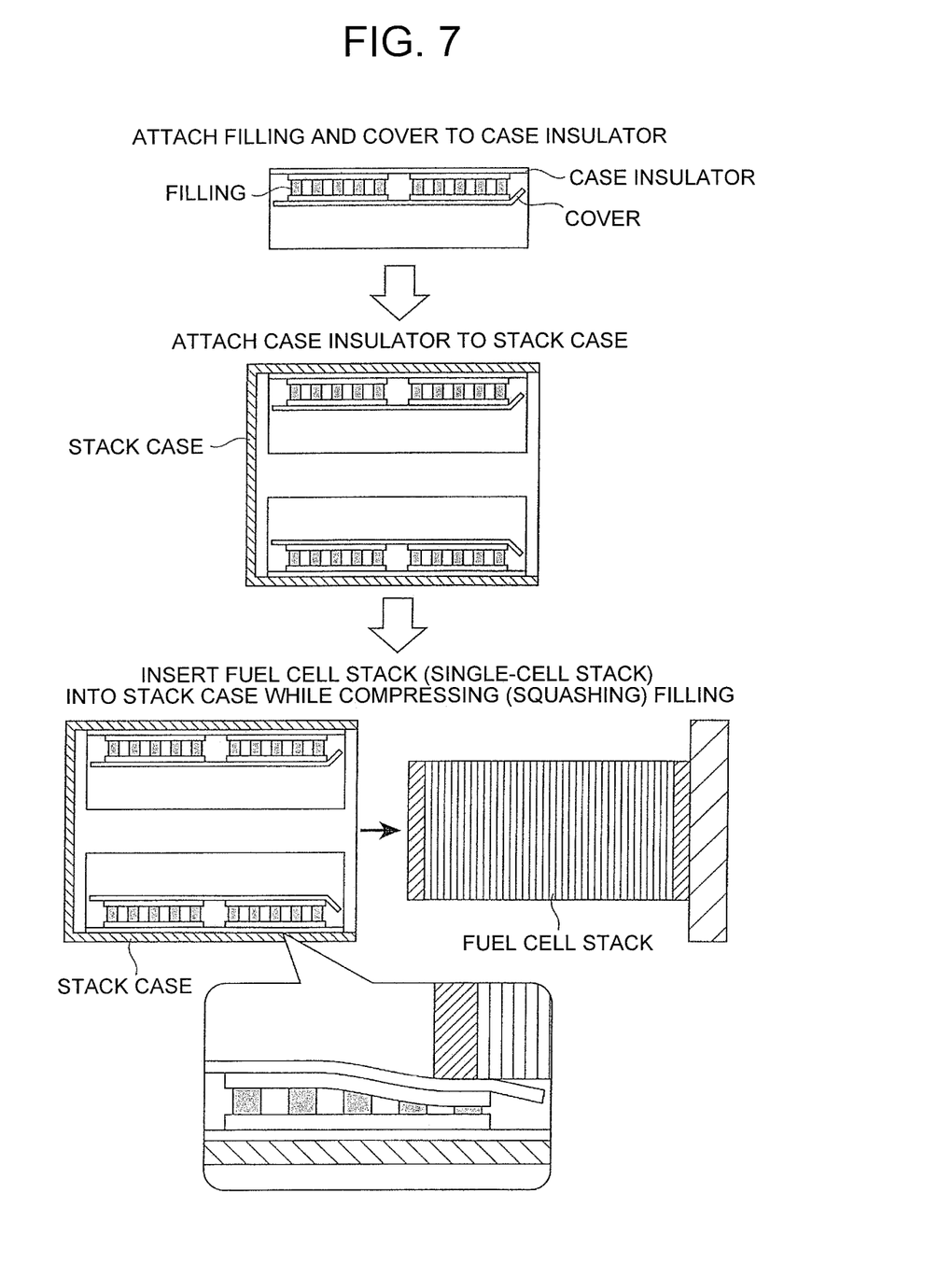
FIG. 7 is an illustration showing another example of fuel cell manufacturing processes including a method in which a filling is installed while being squashed by a member inside a stack case.

Alternatively, as shown in FIG. 7, a filling having a thickness larger than the distance between a stack outer wall surface and a case inner wall surface is prepared. This filling is attached to a case insulator and covered with a cover, and then the case insulator is attached to the case inner wall surface. The fuel cell stack is inserted into the stack case while the filling disposed on the stack case is compressed (squashed) by an end plate disposed at an end of the fuel cell stack (an end in a stacking direction).

Having dilatant properties or a restorability, the filling once squashed recovers thickness and, in the process, exerts a reaction force on the single fuel cells composing the fuel cell stack inserted and housed in the stack case. Therefore, the fuel cell stack can be firmly restrained on the stack case by either method.

Any foreign object entering such a fuel cell and sticking to the filling may degrade the reaction force-exerting properties and the installation quality of the filling. However, if the form of entirely covering the filling (i.e., by a member entirely joined to the case inner wall surface) is adopted as described in JP 2017-174530 A, deformation of the filling being squashed (compressive deformation) as described above may be hindered.

The present disclosure provides a stack case and an outer restraining member for a fuel cell that allow the filling to be reliably installed and assembled, without hindering deformation of the filling being squashed; while preventing entry of foreign objects into the filling.

A stack case for a fuel cell according to the present disclosure is a stack case that houses a single-cell stack formed by a plurality of single fuel cells stacked together, and includes: a filling provided at a case inner wall surface of the stack case to restrain the single-cell stack on the stack case; a base member through which the filling is attached to the case inner wall surface; and a filling cover of which a surface facing the base member is in contact with the filling. The filling cover has at least side surface parts that cover side surfaces of the filling, and at least some of the side surface parts are not joined to the base member.

The filling cover may have a cover surface part of which a surface facing the base member is in contact with the filling, and the side surface parts having sloped portions inclined relative to the cover surface part may be provided at both ends of the cover surface part.

The side surface parts having the sloped portions may be provided at both ends of the cover surface part in an insertion direction of the single-cell stack, and an inclination of the sloped portion provided in the side surface part on the side of an inlet opening of the stack case may be smaller than an inclination of the sloped portion provided in the side surface part on the side opposite from the side of the inlet opening of the stack case.

The side surface parts having the sloped portions may be provided at both ends of the cover surface part in a direction perpendicular to an insertion direction of the single-cell stack, and inclinations of the sloped portions relative to the cover surface part may be not larger than 45°.

The side surface parts may cover an entire periphery of the side surfaces of the filling.

Of the side surface parts, side surface parts provided so as to face a direction perpendicular to an insertion direction of the single-cell stack may not be joined to the base member, while side surface parts provided so as to face the insertion direction of the single-cell stack may be joined to the base member.

End portions of the side surface parts may extend to the base member and be bent so as to abut against the base member.

The filling cover may be an integrally molded part.

A plurality of fillings may be disposed apart from one another in an insertion direction of the single-cell stack, and the filling cover may be configured to cover the fillings collectively.

An outer restraining member for a fuel cell according to the present disclosure is an outer restraining member that is disposed between a single-cell stack formed by a plurality of single fuel cells stacked together and a stack case housing the single-cell stack, and restrains the single-cell stack from the outer side. This outer restraining member includes: a filling that has a rear surface, a front surface, and side surfaces connecting the rear surface and the front surface to each other, and serves to restrain the single-cell stack on the stack case; a base member which is provided on the rear surface side of the filling and through which the filling is attached to a case inner wall surface of the stack case; and a filling cover which is provided on the front surface side of the filling and of which a surface facing the base member is in contact with the filling. The filling cover has at least side surface parts that extend to the base member and cover the side surfaces of the filling, and at least some of the side surface parts are not joined to the base member.

Of the side surface parts, side surface parts provided so as to face a direction perpendicular to an insertion direction of the single-cell stack may not be joined to the base member, while side surface parts provided so as to face the insertion direction of the single-cell stack may be joined to the base member.

End portions of the side surface parts may extend to the base member and be bent so as to abut against the base member.

The filling cover may have a cover surface part of which a surface facing the base member is in contact with the filling, and the side surface parts having sloped portions inclined relative to the cover surface part may be provided at both ends of the cover surface part.

The side surface parts having the sloped portions may be provided at both ends of the cover surface part in an insertion direction of the single-cell stack and at both ends of the cover surface part in a direction perpendicular to the insertion direction of the single-cell stack. An inclination of the sloped portion provided in the side surface part on the side of an inlet opening of the stack case in the insertion direction of the single-cell stack may be smaller than an inclination of the sloped portion provided in the side surface part on the side opposite from the side of the inlet opening of the stack case. Inclinations, relative to the cover surface part, of the sloped portions provided in the side surface parts facing the direction perpendicular to the insertion direction of the single-cell stack may be not larger than 45°.

The filling cover may be an integrally molded part.

A plurality of fillings may be provided apart from one another between the base member and the filling cover.

According to the present disclosure, the filling cover of which the surface facing the base member is in contact with the filling has at least the side surface parts that cover the side surfaces of the filling, and at least some of these side surface parts are not joined to the base member. Thus, it is possible to reliably install and assemble the filling between the fuel cell stack and the stack case, without hindering deformation of the filling being squashed (compressive deformation), while preventing entry of foreign objects into the filling during storage, transportation, etc.

The filling cover has the cover surface part of which the surface facing the base member is in contact with the filling, and the side surface parts having the sloped portions inclined relative to the cover surface part are provided at both ends of the cover surface part. Thus, the fuel cell stack can be smoothly inserted into and removed from the stack case.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The configuration of the present disclosure will be described below in detail based on an example of embodiments shown in the drawings. While a case where the present disclosure is applied to a fuel cell installed in a fuel cell vehicle will be taken as an example in the following description, the scope of application is not limited to this example.

Configuration of Fuel Cell (Fuel Cell Stack)

Figure 1:
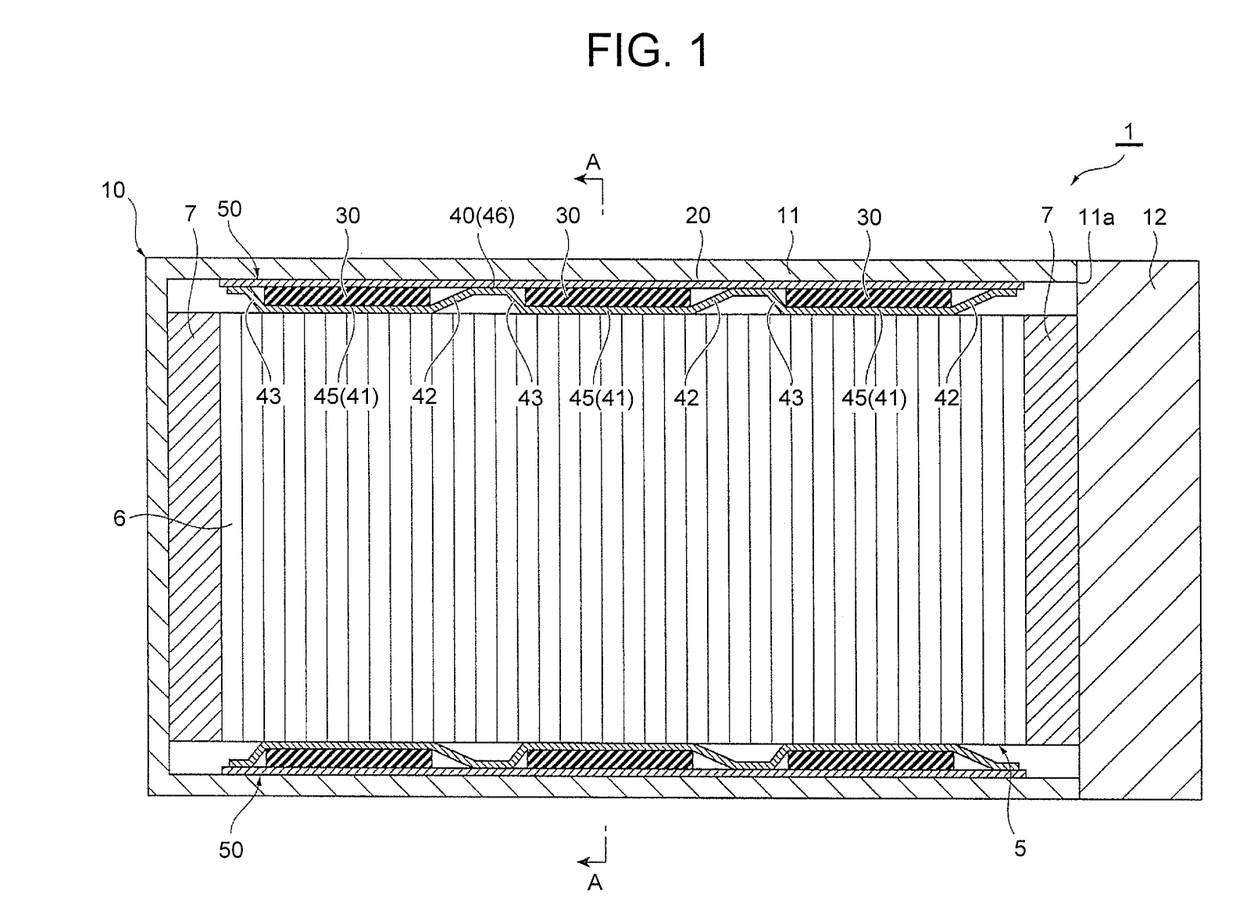
FIG. 1 is a sectional view showing a schematic configuration of a fuel cell according to an embodiment of the present disclosure.
Figure 2:
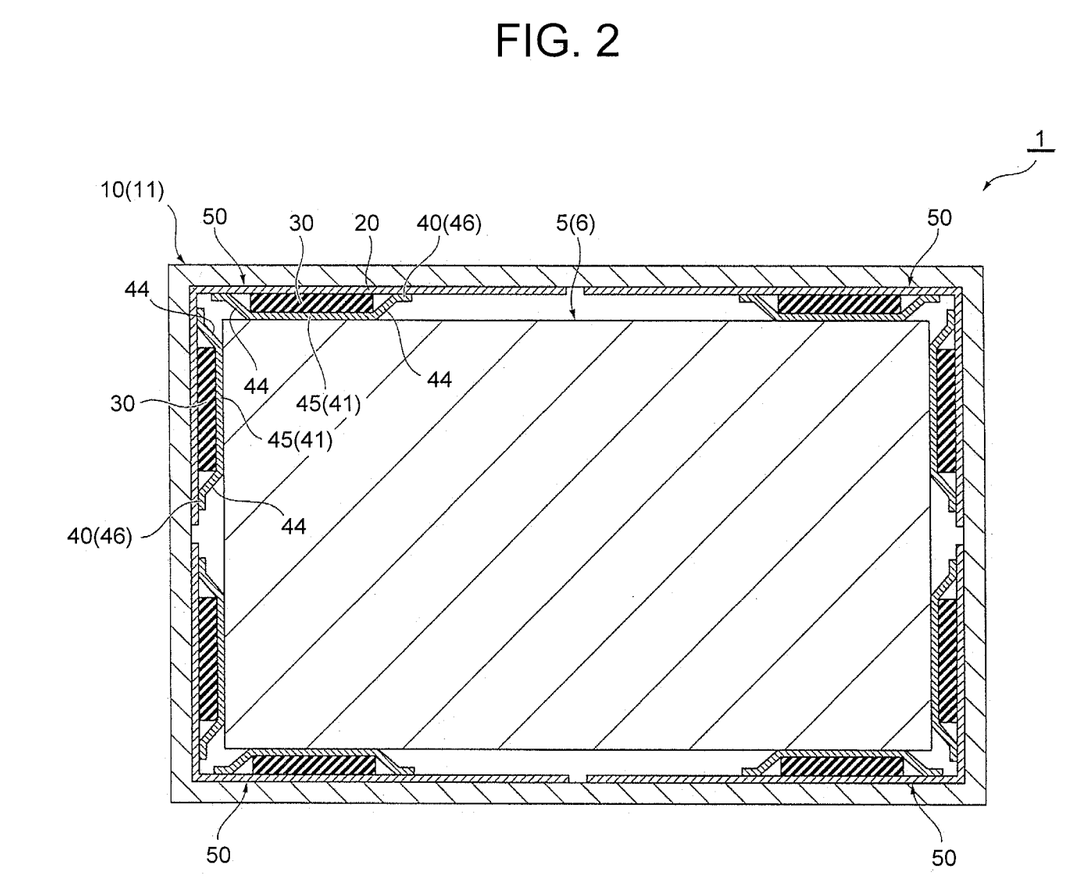
FIG. 2 is a sectional view taken along line I-I of FIG. 1.
Figure 3A:
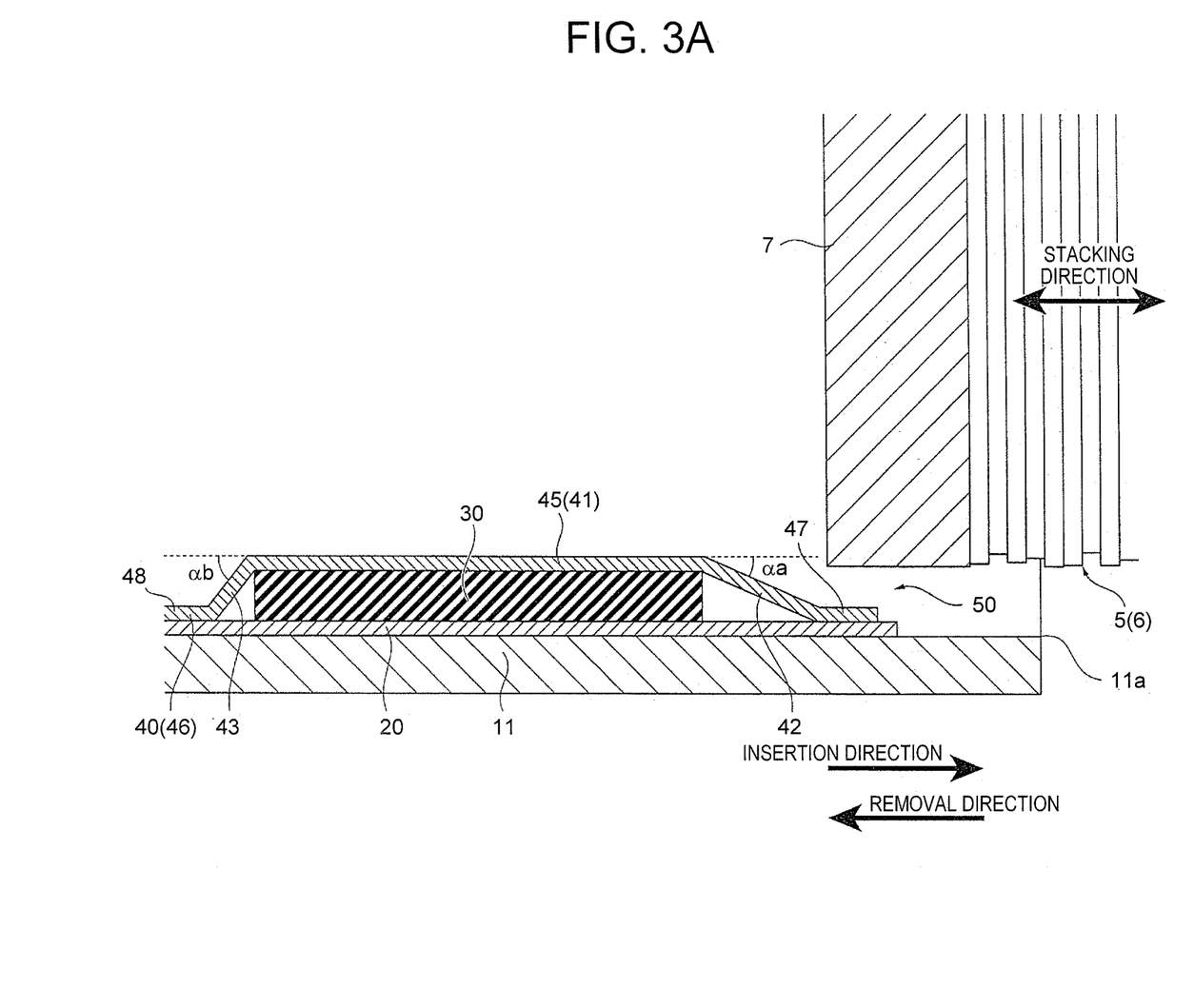
FIG. 3A is an enlarged sectional view of a main part of FIG. 1, showing a state before insertion of a fuel cell stack.
Figure 3B:
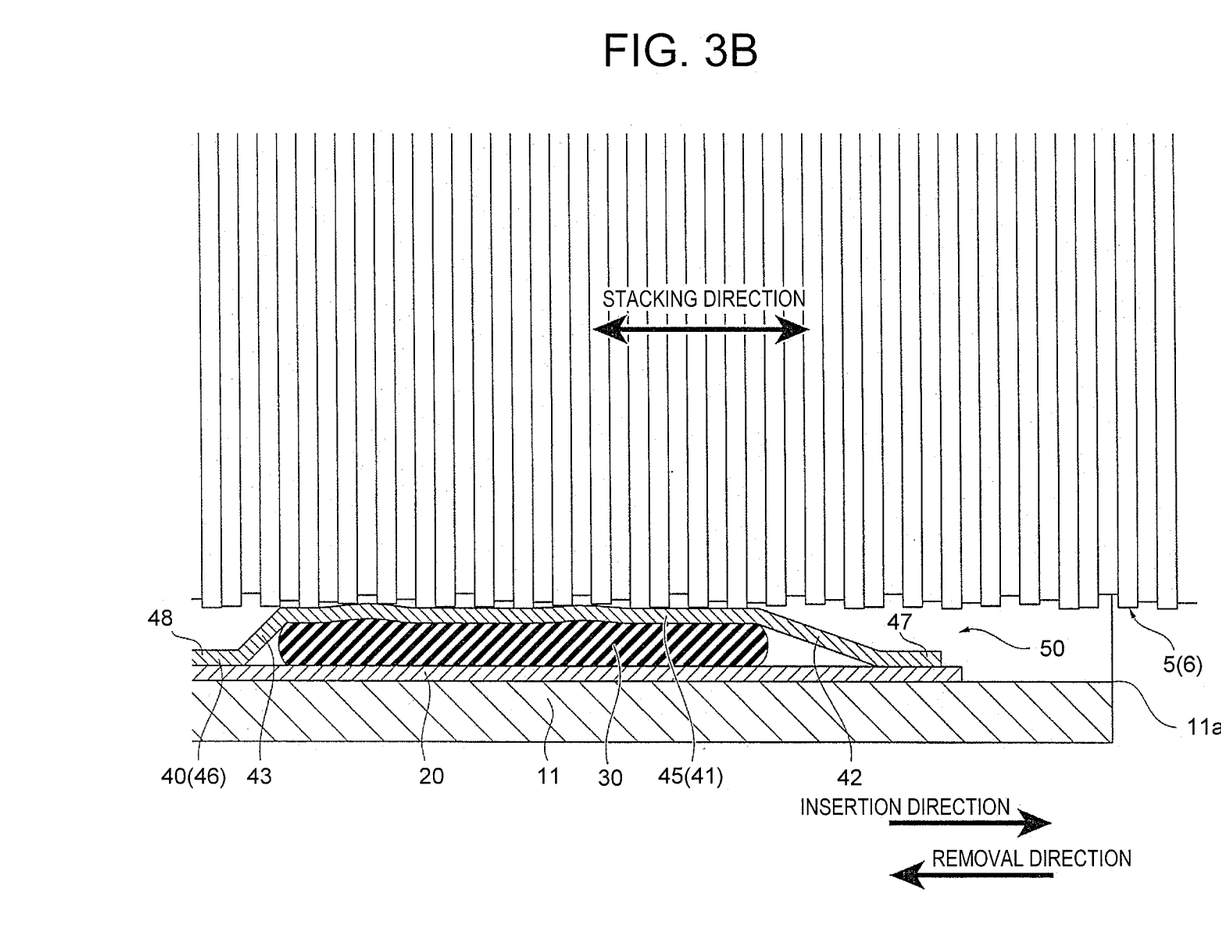
FIG. 3B is an enlarged sectional view of the main part of FIG. 1, showing a state after insertion of the fuel cell stack.
Figure 4A:
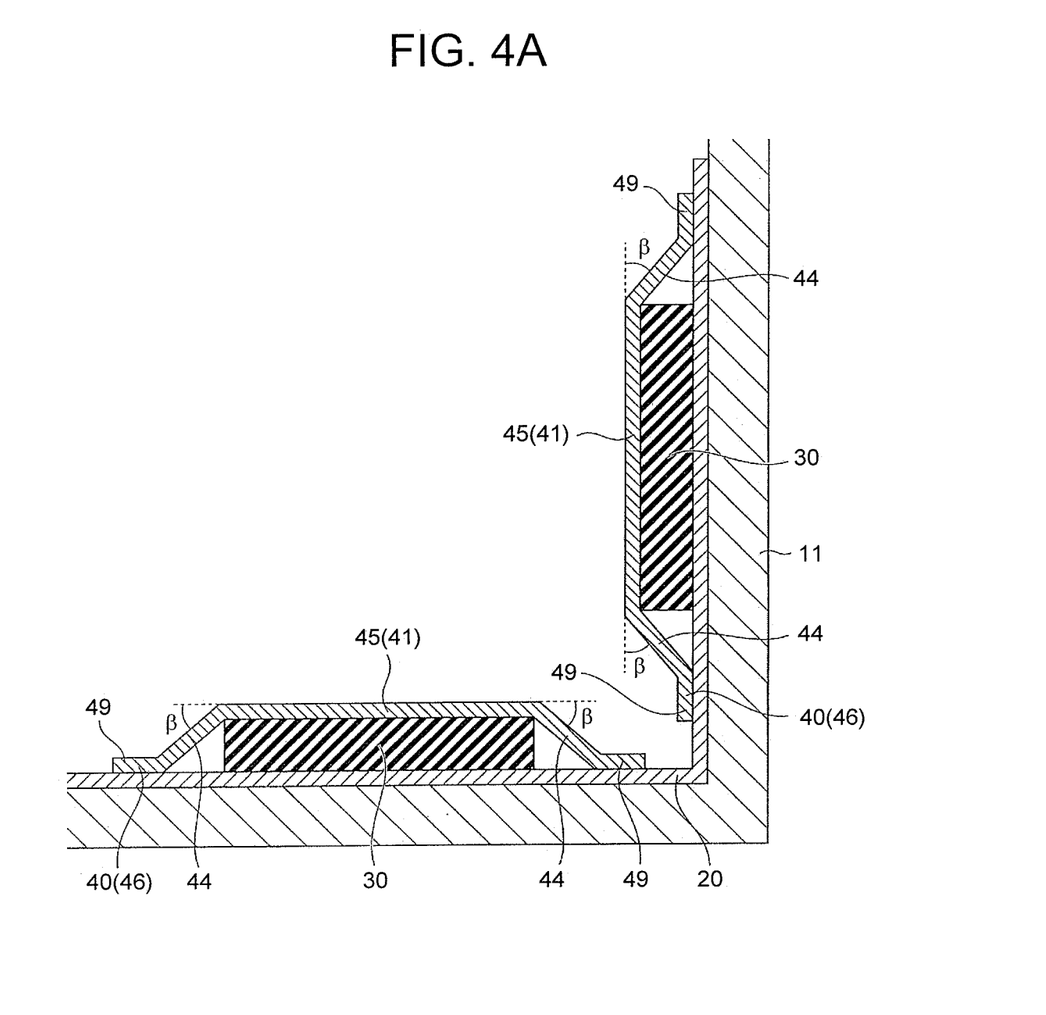
FIG. 4A is an enlarged sectional view of a main part of FIG. 2, showing a state before insertion of the fuel cell stack.
Figure 4B:
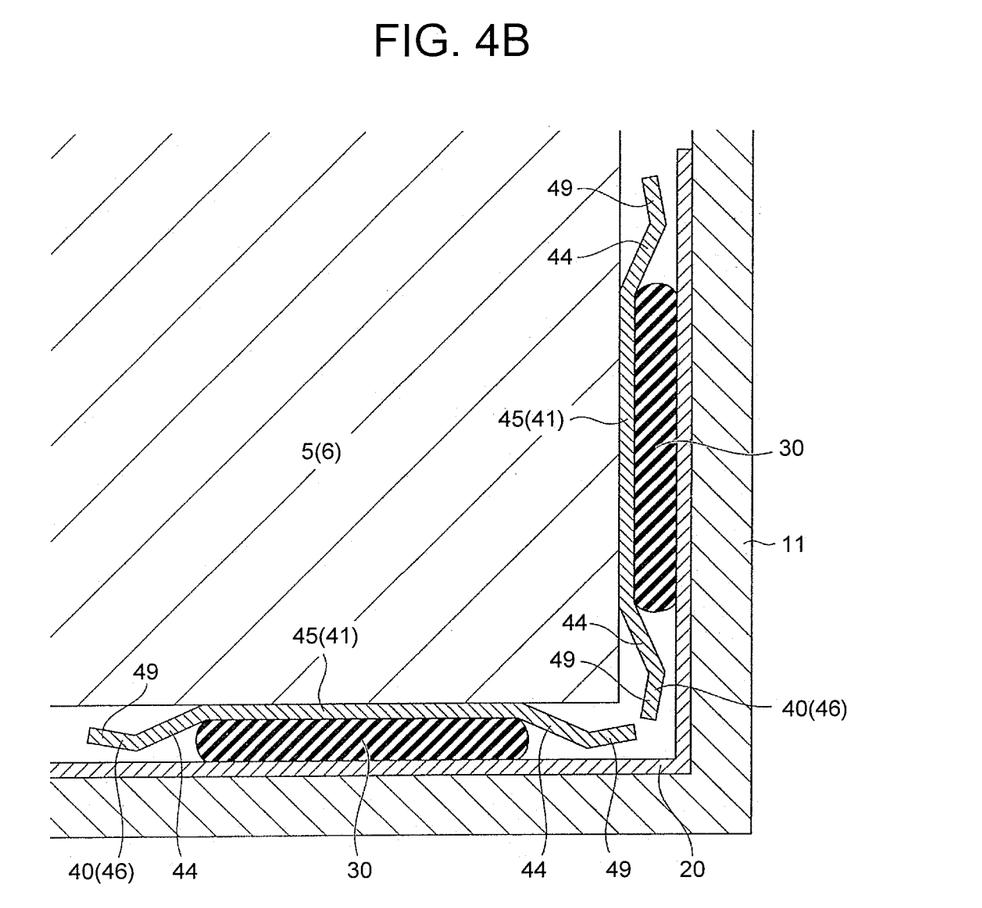
FIG. 4B is an enlarged sectional view of the main part of FIG. 2, showing a state after insertion of the fuel cell stack.

FIG. 1 is a sectional view showing a schematic configuration of a fuel cell according to an embodiment of the present disclosure, and FIG. 2 is a sectional view taken along line I-I of FIG. 1.

A fuel cell 1 in the shown embodiment mainly includes a fuel cell stack 5, a stack case 10 that houses the fuel cell stack 5, and outer restraining members (also referred to as filling sub-assemblies) 50 disposed between the fuel cell stack 5 and the stack case 10.

The fuel cell stack 5 has a stack structure in which a plurality of single fuel cells (also referred to as single cells) 6 that is solid polymer electrolyte fuel cells is stacked together between two (a pair of) end plates (also referred to as pressure plates) 7, 7. A stack formed by the single fuel cells 6 stacked together is also referred to as a single-cell stack. The single fuel cells 6 are fastened together through fastening shafts (not shown) that are inserted into through-holes bored at corners etc. of the end plates 7 and the single fuel cells 6. Both the end plate 7 and the single fuel cell 6 have a rectangular shape, and the fuel cell stack 5 has a substantially cuboid external shape.

Although this is not shown, the single fuel cell 6 includes, for example, a membrane-electrode assembly (MEA) composed of an ion-permeable electrolyte membrane and an anode-side catalytic layer (electrode layer) and a cathode-side catalytic layer (electrode layer) that sandwich this electrolyte membrane, and a pair of separators that sandwich the MEA and form flow passages for reactant gases (a fuel gas and an oxidant gas) and a cooling medium.

The fuel gas (hydrogen etc.) and the oxidant gas (air etc.) as reactant gases are supplied to the fuel cell stack 5 (fuel cell 1), and electricity is generated in each single fuel cell 6 by electrochemical reactions using the fuel gas and the oxidant gas.

Configuration of Stack Case

The stack case 10 is a case made of metal, for example, aluminum or stainless steel, and includes a case main body 11 and a lid 12. In this example, the lid 12 is integrally mounted on the end plate 7 of the pair of end plates 7, 7 that is disposed on a side opposite from a side from which the fuel cell stack 5 is inserted into the stack case 10.

The case main body 11 has substantially a shape of a cuboid open at one end, with a hollow space that is slightly larger than the fuel cell stack 5 as seen in cross section perpendicular to an insertion (enclosing) direction (i.e., a stacking direction) of the fuel cell stack 5 (e.g., cross section shown in FIG. 2), and can house the fuel cell stack 5 along the stacking direction of the single fuel cells 6. The lid 12 (integrated with the end plate 7) is fixed with bolts etc. (not shown) over an opening (inlet opening 11a) at one end of the case main body 11 after the fuel cell stack 5 is housed. Thus, the stack case 10 hermetically houses the fuel cell stack 5 in a compressed state.

The shape, components, etc. of the stack case 10 described above are merely examples, and the stack case 10 is, of course, not limited to the shown example as long as the stack case 10 can house the fuel cell stack 5 (along the stacking direction) and allows the outer restraining members 50, to be described later, to be disposed on a case inner wall surface (also referred to as a case-side wall surface).

Configuration of Outer Restraining Member and Workings and Effects Thereof

The outer restraining members 50 are disposed between (the single-cell stack of) the fuel cell stack 5 and the stack case 10, i.e., between a stack outer wall surface (outer peripheral surface) of (the single-cell stack of) the fuel cell stack 5 extending along the stacking direction, and the case inner wall surface (inner peripheral surface) of the stack case 10 facing the stack outer wall surface. In this example, as seen in cross section along the stacking direction (e.g., the cross section shown in FIG. 1), the outer restraining members 50 are provided along substantially the entire length of the fuel cell stack 5 in the stacking direction (from one end to the other end in the stacking direction). On the other hand, as seen in cross section perpendicular to the stacking direction (e.g., the cross section shown in FIG. 2), the outer restraining members 50 are (dispersedly) provided in the vicinity of four corners of the substantially cuboid fuel cell stack 5 or stack case 10, in other words, in the vicinity of four corners of a rectangular tubular hollow space formed between the fuel cell stack 5 and the stack case 10.

Each outer restraining member 50 is basically composed of a filling 30, a case insulator 20 serving as an insulating layer provided on a rear surface side of the filling 30 (on the side of the case inner wall surface of the stack case 10), and a filling cover (hereinafter referred to simply as a cover) 40 provided on a front surface side of the filling 30 (on the side of the stack outer wall surface of the fuel cell stack 5). The filling 30 is sandwiched between the case insulator 20 and the cover 40, and these components are thereby integrated.

Specifically, the filling 30 is made of an elastic material having flexibility and insulating properties, such as silicon rubber or urethane rubber. In this example, the filling 30 has a substantially rectangular shape. As seen in cross section along the stacking direction (e.g., the cross section shown in FIG. 1), three fillings 30 are provided at predetermined intervals (apart from one another) along the stacking direction of the fuel cell stack 5, and as seen in cross section perpendicular to the stacking direction (e.g., the cross section shown in FIG. 2), one filling 30 is provided on each of side portions at each corner between the fuel cell stack 5 and the stack case 10 (in other words, on an inner surface of each of side portions of the bent or L-shaped case insulator 20 to be described later). Thus, in this example, six fillings 30 are provided in each outer restraining member 50.

The case insulator 20 is made of a resin material having insulating properties, such as polyethylene terephthalate. In this example, as seen in cross section perpendicular to the stacking direction (e.g., the cross section shown in FIG. 2), the case insulator 20 has a bent shape or an L-shape that fits the case inner wall surface at the corner of the stack case 10. With the fillings 30 placed on the inner surface, the case insulator 20 is disposed such that an outer surface thereof fits the case inner wall surface at the corner of the stack case 10. Thus, the case insulator 20 not only provides insulation between the fuel cell stack 5 and the stack case 10, but also functions as a base member through which the fillings 30 are attached to the case inner wall surface of the stack case 10.

The cover 40 is made of a resin material having high smoothness and insulating properties, such as polyethylene terephthalate or polypropylene. In this example, the cover 40 has a shape of an elongated sheet with a long side oriented in the stacking direction of the fuel cell stack 5. One cover 40 is provided on each of the side portions at each corner between the fuel cell stack 5 and the stack case 10 (in other words, on the inner surface of each of the side portions of the bent or L-shaped case insulator 20), and collectively covers (the front surfaces of) a plurality of (in the shown example, three) fillings 30 disposed apart from one another in the stacking direction. Thus, in this example, two covers 40 are provided in each outer restraining member 50. Alternatively, the covers 40 may be configured to separately cover (the front surfaces of) the fillings 30 disposed apart from one another in the stacking direction. The cover 40 is disposed between the fillings 30 and the fuel cell stack 5, and (as will be described in detail later) is joined and fixed to the case insulator 20 such that a surface of the cover 40 facing the case insulator 20 covers the front surface of each filling 30 (specifically, the surface of each filling 30 that faces the stack outer peripheral surface of the fuel cell stack 5 and can come into contact with the end plate 7 of the fuel cell stack 5).

Disposing the highly smooth cover 40 on the front surfaces of the fillings 30 can reduce displacement of the fillings 30 resulting from directly interfering with the single fuel cells 6 composing the fuel cell stack 5. Moreover, such a cover 40 can reduce the load required to insert the fuel cell stack 5 into (the case main body 11 of) the stack case 10 (an insertion load or a pressing-in load), allowing the fuel cell stack 5 to be easily inserted into (the case main body 11 of)

the stack case 10. In addition, as the contact between the fillings 30 and the cover 40 is well smoothed, the fillings 30 are less likely to become immovable by adhering to the cover 40, and the fillings 30 can be easily squashed (deformed).

More specifically, in this example, the cover 40 has a shape of an elongated sheet with a long side oriented in the stacking direction of the fuel cell stack 5, and is formed so as to be wider than the filling 30 but narrower than the case insulator 20 as seen in cross section perpendicular to the stacking direction (e.g., the cross section shown in FIG. 2). In the cover 40, (a plurality of) truncated quadrangular pyramid-shaped housing sections 45, each large enough to surround the filling 30, are provided so as to protrude at positions corresponding to the fillings 30 along the stacking direction, and a portion surrounding each housing section 45 forms an abutting portion 46 that abuts against the inner surface of the case insulator 20.

As can be clearly seen by referring to FIG. 3A to FIG. 5 along with FIG. 1 and FIG. 2, a top part of each housing section 45 forms a rectangular flat plate-shaped cover surface part 41 of which a surface facing the case insulator 20 is in contact with the front surface of the filling 30. Side surface parts 42, 43 that cover side surfaces of the filling 30 (specifically, the side surface on one side in the stacking direction that is the side surface on the side of the inlet opening 11a, and the side surface on the other side in the stacking direction that is the side surface on the side opposite from the side of the inlet opening 11a) are (integrally) provided so as to extend in the stacking direction from (outer ends of) the cover surface part 41, and side surface parts 44, 44 that cover side surfaces of the filling 30 (specifically, the side surfaces facing a direction orthogonal to the stacking direction) are (integrally) provided so as to extend in a direction perpendicular (orthogonal) to the stacking direction from (outer ends of) the cover surface part 41. End portions of the side surface parts 42, 43, 44, 44 extend to (the inner surface of) the case insulator 20 and are bent into the form of a leg, and thus form the abutting portion 46 that abuts against the inner surface of the case insulator 20. In other words, each housing section 45 has the rectangular flat plate-shaped cover surface part 41 that is in contact with the front surface of the filling 30; the four side surface parts 42, 43, 44, 44 that extend from the outer ends (outer edges) of the cover surface part 41 and cover (the entire periphery of) the side surfaces of the filling 30 are (integrally and continuously) provided; and the abutting portion 46 is (integrally and continuously) provided so as to surround the end portions of the four side surface parts 42, 43, 44, 44. Thus, the cover 40 of this embodiment is an integrally and three-dimensionally molded part in which the housing sections 45 having such a three-dimensional shape are provided (apart from one another).

In this embodiment, the side surface parts 42, 43, 44, 44 forming the housing section 45 are formed so as to be inclined relative to the cover surface part 41 and the case insulator 20 (and the case inner peripheral surface of the stack case 10). In other words, the entire side surface parts 42, 43, 44, 44 are formed as sloped portions inclined relative to the cover surface part 41 and the case insulator 20 (and the case inner peripheral surface of the stack case 10). In a state where no load is applied, an inclination (inclination angle) aa of the side surface part (sloped portion) 42 provided on one side in the stacking direction (the side of the inlet opening 11a of the stack case 10; the side from which the fuel cell stack 5 is inserted) is set to be smaller than an inclination (inclination angle) ab of the side surface part (sloped portion) 43 provided on the other side in the stacking direction (the side opposite from the side of the inlet opening 11a of the stack case 10; the side from which the fuel cell stack 5 is removed) (see FIG. 3A), and inclinations (inclination angles) 13 of the side surface parts (sloped portions) 44, 44 provided so as to face the direction perpendicular to the stacking direction are set to be not larger than 45° (see FIG. 4A).

Figure 5:
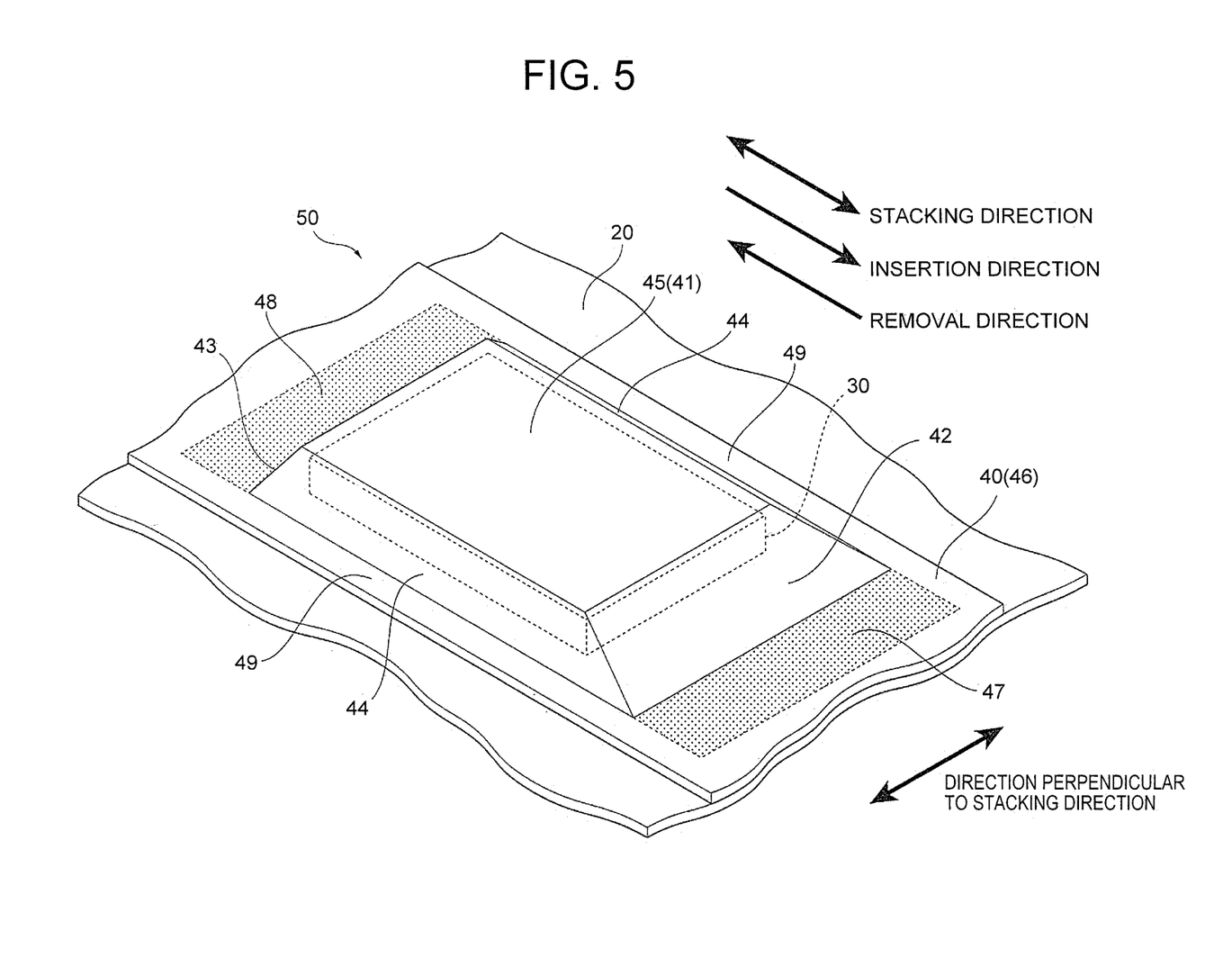
FIG. 5 is an enlarged perspective view of a main part of an outer restraining member.

In this embodiment, predetermined regions of the abutting portion 46 adjoining the side surface parts 42, 43 provided so as to face the stacking direction (hereinafter these predetermined regions will be referred to as abutting portions 47, 48, which are represented by hatched areas in FIG. 5) abut against (the inner surface of) the case insulator 20, and are joined and fixed to (the inner surface of) the case insulator 20 by welding, taping, etc. On the other hand, predetermined regions of the abutting portion 46 adjoining the side surface parts 44, 44 provided so as to face the direction perpendicular to the stacking direction (hereinafter these predetermined regions will be referred to as abutting portions 49, 49) merely abut against (the inner surface of) the case insulator 20, and are not fixed to (the inner surface of) the case insulator 20. Thus, the side surface parts 42, 43 provided so as to face the stacking direction are joined and fixed to the case insulator 20, while the side surface parts 44, 44 provided so as to face the direction perpendicular to the stacking direction are not joined and fixed to the case insulator 20.

As the cover 40 is joined and attached (at the abutting portions 47, 48) to the case insulator 20 as described above, the filling 30 is interposed (sandwiched) between the case insulator 20 and (the housing section 45 of) the cover 40 and these components are thereby integrated. The outer restraining member 50 having this integral structure is disposed at a predetermined position between (the single-cell stack of) the fuel cell stack 5 and the stack case 10.

The filling 30 constituting part of the outer restraining member 50 has electrically insulating properties as well as dilatant properties or restorability. In a state where no load is applied, (the filling 30 of) the outer restraining member 50 has a thickness larger than the distance between the stack outer wall surface of the fuel cell stack 5 along the stacking direction and the case inner wall surface of the stack case 10 facing the stack outer wall surface. Therefore, one can easily house the fuel cell stack 5 inside the stack case 10, without being affected by (the fillings 30 of) the outer restraining members 50, by squashing (the fillings 30 of) the outer restraining members 50 so as to make the thickness of (the fillings 30 of) the outer restraining members 50 smaller than the distance, disposing the squashed outer restraining members 50 on the case inner wall surface of the stack case 10 (or on the stack outer wall surface of the fuel cell stack 5), and housing the fuel cell stack 5 inside the stack case 10 (specifically, enclosing the fuel cell stack 5 with (the case main body 11 of) the stack case 10) before (the fillings 30 of) the outer restraining members 50 expand to the thickness of the distance (see FIG. 6). Alternatively, one can easily house the fuel cell stack 5 inside the stack case 10, for example, by disposing the outer restraining members 50 on the case inner wall surface of the stack case 10, and housing the fuel cell stack 5 inside the stack case 10 (specifically, enclosing the fuel cell stack 5 with (the case main body 11 of) the stack case 10) while compressing (squashing) (the fillings 30 of) the outer restraining members 50 by (the end plate 7 of) the fuel cell stack 5 (see FIG. 7). In either case, the fillings 30 thereafter recover thickness while elastically expanding, but do not recover the original thickness thereof; instead, the fillings 30 fill the clearance between the fuel cell stack 5 and the stack case 10 by conforming to the uneven shape of the single fuel cells 6 of the fuel cell stack 5 (see especially FIG. 3B and FIG. 4B), and are thus disposed in a compressed state between the stack outer wall surface of the fuel cell stack 5 and the case inner wall surface of the stack case 10. As the fuel cell stack 5 is restrained on the stack case 10 by these elastic fillings 30, the resistance of the fuel cell stack 5 to vibration and impact is enhanced, and displacement (especially displacement in the direction perpendicular to the stacking direction) of the single fuel cells 6 composing the fuel cell stack 5 is reduced.

The filling 30 constituting part of the outer restraining member 50 may be a filling that is sealed in a bag made of polypropylene etc. and, after filling a clearance, cures inside the bag to exhibit the above-described restraining function etc.

As described above, the cover 40 covering the filling 30 is molded into a three-dimensional shape (three-dimensionally molded), and the filling 30 is housed inside the housing section 45 of the cover 40. The side surface parts 42, 43, 44, 44 of the housing section 45 of the cover 40 extend to the case insulator 20 and have the end portions thereof abutted against (the inner surface of) the case insulator 20, and the (entire) side surfaces of the filling 30 are covered (in other words, closed) by the side surface parts 42, 43, 44, 44 of the housing section 45 of the cover 40. Thus, foreign objects can be prevented from entering and sticking to the filling 30 (see especially FIG. 5).

As described above, the abutting portions 47, 48 adjoining the side surface parts 42, 43 provided so as to face the stacking direction (the direction in which force is exerted during insertion and removal) are joined and fixed to the case insulator 20, while the abutting portions 49, 49 adjoining the side surface parts 44, 44 provided so as to face the direction perpendicular to the stacking direction (the direction in which force is hardly exerted during insertion and removal) merely abut against the case insulator 20 and are not fixed thereto. Thus, displacement and coming off of the cover 40 while the fuel cell stack 5 is inserted into or removed from the stack case 10 during assembly can be reduced. Moreover, when (the filling 30 of) the outer restraining member 50 is squashed, the side surface parts 44, 44 and the abutting portions 49, 49 deflect (spread or open) in a lateral direction (the direction perpendicular to the stacking direction) to release the force, so that deformation of the filling 30 being squashed (compressive deformation) is unlikely to be hindered (see especially FIG. 4B).

The side surface parts 42, 43, 44, 44 are each provided with the sloped portion (form the sloped portion) inclined relative to the cover surface part 41. This allows the fuel cell stack 5 to be smoothly inserted into and removed from (the case main body 11 of) the stack case 10 during assembly. In particular, the abutting portions 47, 48 adjoining the side surface parts 42, 43 provided so as to face the stacking direction (insertion and removal directions) are joined and fixed to the case insulator 20, and the inclination (inclination angle) $\alpha a$ of the side surface part (sloped portion) 42 is set to be smaller than the inclination (inclination angle) $\alpha b$ of the side surface part (sloped portion) 43. In other words, the inclination angle $\alpha a$ of the side surface part (sloped portion) 42 on the side of the inlet opening 11a of the stack case 10 that is the side from which the fuel cell stack 5 is inserted, is gentler than the inclination angle $\alpha b$ of the side surface part (sloped portion) 43 on the side opposite from the side of the inlet opening 11a of the stack case 10 that is the side from which the fuel cell stack 5 is removed. This makes it possible to smoothly insert (house) the fuel cell stack 5 inside (the case main body 11 of) the stack case 10 during assembly while reducing displacement and coming off of the cover 40 during assembly.

For example, in the case of attaching the squashed fillings 30 to (the inner surface of) the case insulator 20, attaching the case insulator 20 to the case inner wall surface of (the case main body 11 of) the stack case 10, attaching the covers 40 covering the front surfaces of the fillings 30 to the case insulator 20, and then inserting the fuel cell stack 5 into the stack case 10, it is necessary to assemble the case insulator 20, the fillings 30, and the covers 40 while attaching these components to one another by means of another member, which adds to the number of components and causes an increase in costs as well as takes a longer installation time. As described above, this embodiment adopts the integral structure in which the filling 30 is sandwiched between the two parts, namely the case insulator 20 that is a resin film member providing electrical insulation between the fuel cell stack 5 and the stack case 10 and the cover 40 that protects the filling 30 from getting damaged by the single fuel cells 6, and this integral structure is disposed between the fuel cell stack 5 and the stack case 10. Thus, costs can be kept down and the installation time can be reduced.

It should be understood that the number, position, shape, etc. of the outer restraining members 50 that are disposed between the fuel cell stack 5 and the stack case 10 to restrain and retain (the single-cell stack of) the fuel cell stack 5 are not limited to those of the shown example. In the shown example, the outer restraining members 50 are each composed of six fillings 30, one case insulator 20, and two covers 40 that are integrated with one another, but the number, position, shape, etc. of the outer restraining members 50 are, of course, not limited to those of the shown example.

In the above embodiment, the entire side surface parts 42, 43, 44, 44 of the housing section 45 of the cover 40 are formed as the sloped portions inclined relative to the cover surface part 41. Alternatively, only a portion (e.g., only a portion adjoining the cover surface part 41, only an intermediate portion, or only a portion adjoining the abutting portion 46) of each of the side surface parts 42, 43, 44, 44 may be formed as a sloped portion.

As has been described above, according to the embodiment, the filling cover 40 of which the surface facing the case insulator 20 serving as the base member is in contact with the filling 30 has at least the side surface parts 42, 43, 44, 44 that cover the side surfaces of the filling 30 (the side surfaces connecting the rear surface and the front surface to each other), and at least some (specifically, the side surface parts 44,44) of the side surface parts 42, 43, 44, 44 are not joined to the case insulator 20. Thus, it is possible to reliably install and assemble the fillings 30 between the fuel cell stack 5 and the stack case 10, without hindering deformation of the fillings 30 being squashed (compressive deformation), while preventing entry of foreign objects into the fillings 30 during storage, transportation, etc.

The filling cover 40 has, the cover surface part 41 of which the surface facing the case insulator 20 serving as the base member is in contact with the filling 30, and the side surface parts 42, 43, 44, 44 having the sloped portions inclined relative to the cover surface part 41 are provided at both ends of the cover surface part 41. Thus, the fuel cell stack 5 can be smoothly inserted into and removed from (the case main body 11 of) the stack case 10.

While the embodiment of the present disclosure has been described above in detail using the drawings, the specific configuration is not limited to that of the embodiment, and any design changes etc. within the scope of the gist of the disclosure are included in the disclosure.

What is claimed is:

1. A stack case that houses a single-cell stack formed by a plurality of single fuel cells stacked together, the stack case comprising:
    a filling provided at a case inner wall surface of the stack case to restrain the single-cell stack on the stack case;
    a base member through which the filling is attached to the case inner wall surface; and
    a filling cover of which a surface facing the base member is in contact with the filling, wherein
    the filling cover has at least side surface parts that cover side surfaces of the filling, and at least some of the side surface parts are not joined to the base member.

2. The stack case according to claim 1, wherein the filling cover has a cover surface part of which a surface facing the base member is in contact with the filling, and the side surface parts having sloped portions inclined relative to the cover surface part are provided at both ends of the cover surface part.

3. The stack case according to claim 2, wherein:
    the side surface parts having the sloped portions are provided at both ends of the cover surface part in an insertion direction of the single-cell stack; and
    an inclination of the sloped portion provided in the side surface part on a side of an inlet opening of the stack case is smaller than an inclination of the sloped portion provided in the side surface part on a side opposite from the side of the inlet opening of the stack case.

4. The stack case according to claim 2, wherein:
    the side surface parts having the sloped portions are provided at both ends of the cover surface part in a direction perpendicular to an insertion direction of the single-cell stack; and
    inclinations of the sloped portions relative to the cover surface part are not larger than 45°.

5. The stack case according to claim 1, wherein the side surface parts cover an entire periphery of the side surfaces of the filling.

6. The stack case according to claim 1, wherein, of the side surface parts, side surface parts provided so as to face the direction perpendicular to an insertion direction of the single-cell stack are not joined to the base member, while side surface parts provided so as to face the insertion direction of the single-cell stack are joined to the base member.

7. The stack case according to claim 1, wherein end portions of the side surface parts extend to the base member and are bent so as to abut against the base member.

8. The stack case according to claim 1, wherein the filling cover is an integrally molded part.

9. The stack case according to claim 1, wherein a plurality of fillings is disposed apart from one another in an insertion direction of the single-cell stack, and the filling cover is configured to cover the fillings collectively.

10. An outer restraining member that is disposed between a single-cell stack formed by a plurality of single fuel cells stacked together and a stack case housing the single-cell stack, and restrains the single-cell stack from an outer side, the outer restraining member comprising:
    a filling that has a rear surface, a front surface, and side surfaces connecting the rear surface and the front surface to each other, and serves to restrain the single-cell stack on the stack case;
    a base member which is provided on a rear surface side of the filling and through which the filling is attached to a case inner wall surface of the stack case; and
    a filling cover which is provided on a front surface side of the filling and of which a surface facing the base member is in contact with the filling, wherein
    the filling cover has at least side surface parts that extend to the base member and cover the side surfaces of the filling, and at least some of the side surface parts are not joined to the base member.

11. The outer restraining member according to claim 10, wherein, of the side surface parts, side surface parts provided so as to face a direction perpendicular to an insertion direction of the single-cell stack are not joined to the base member, while side surface parts provided so as to face the insertion direction of the single-cell stack are joined to the base member.

12. The outer restraining member according to claim 10, wherein end portions of the side surface parts extend to the base member and are bent so as to abut against the base member.

13. The outer restraining member according to claim 10, wherein the filling cover has a cover surface part of which a surface facing the base member is in contact with the filling, and the side surface parts having sloped portions inclined relative to the cover surface part are provided at both ends of the cover surface part.

14. The outer restraining member according to claim 13, wherein:
    the side surface parts having the sloped portions are provided at both ends of the cover surface part in an insertion direction of the single-cell stack and at both ends of the cover surface part in a direction perpendicular to the insertion direction of the single-cell stack;
    an inclination of the sloped portion provided in the side surface part on a side of an inlet opening of the stack case in the insertion direction of the single-cell stack is smaller than an inclination of the sloped portion provided in the side surface part on a side opposite from the side of the inlet opening of the stack case; and
    inclinations, relative to the cover surface part, of the sloped portions provided in the side surface parts facing the direction perpendicular to the insertion direction of the single-cell stack are not larger than 45°.

15. The outer restraining member according to claim 10, wherein the filling cover is an integrally molded part.

16. The outer restraining member according to claim 10, wherein a plurality of fillings is provided apart from one another between the base member and the filling cover.

* * * * *